United States Patent [19]

Marian

[11] Patent Number: 5,208,855

[45] Date of Patent: May 4, 1993

[54] METHOD AND APPARATUS FOR IRRIGATION CONTROL USING EVAPOTRANSPIRATION

[76] Inventor: Michael B. Marian, 2110 Meadowview Dr., Petaluma, Calif. 94954

[21] Appl. No.: 763,001

[22] Filed: Sep. 20, 1991

[51] Int. Cl.$^5$ .................. H04K 1/02; A01G 25/16
[52] U.S. Cl. ................................ 380/9; 239/69
[58] Field of Search ............. 47/17; 239/69, 70; 380/9; 364/420

[56] References Cited

U.S. PATENT DOCUMENTS

| | | | |
|---|---|---|---|
| Re. 31,023 | 9/1982 | Hall, III | 239/69 |
| 4,010,898 | 3/1977 | Williams | 239/11 |
| 4,646,224 | 2/1987 | Ransburg et al. | 239/69 |
| 4,709,585 | 12/1987 | Altenhofen . | |
| 4,837,499 | 6/1989 | Scherer, III . | |
| 4,856,227 | 8/1989 | Oglevee et al. | 47/17 |
| 4,858,377 | 8/1989 | Oglevee et al. | 47/17 |
| 4,934,400 | 6/1990 | Cuming | 239/70 |
| 4,952,868 | 8/1990 | Scherer, III | 239/63 |
| 4,962,522 | 10/1990 | Marian | 239/70 |
| 4,967,789 | 11/1990 | Kypris . | |
| 5,023,787 | 6/1991 | Evelyn-Veere | 239/69 |

OTHER PUBLICATIONS

Blaney, H. F., et al., (Aug. 1950), "Determining Water Requirements in Irrigated Areas from Climatological and Irrigation Data", *U.S. Dept. of Agri. Soil Conserv. Service*, pp. 1–48.

Penman, H. L., (1948), "Natural Evaporation from Open Water, Bare Soil and Grass", *Proceedings*, Royal Soc., Series A., vol. 193, pp. 120–145.

Jensen, M. E., (Dec. 1963), "Estimating Evapotranspiration from Solar Radiation", *J. Irrig. and Drainage Div.*, pp. 15–41.

Jensen, M. E., (Sep. 1983), "Design and Operation of Farm Irrigation Systems", *Am. Soc. Agri. Eng.*, No. 3, pp. 1–232.

"How Much Water Does Your Lawn Really Need", *Sunset*, (Jun. 1987), pp. 213–219.

*Primary Examiner*—Salvatore Cangialosi
*Attorney, Agent, or Firm*—Townsend and Townsend

[57] ABSTRACT

The invention bypasses a need for human participation in the process of remotely controlling irrigation sprinklers using Evapotranspiration (ET) values. In one embodiment, a transmitter broadcasts updated Evapotranspiration (ET) data directly to a collection of receiver/controller units using an FM subcarrier. These receiver/controller units are microprocessor-based and coupled to a set of irrigation sprinklers.

The method provides for broadcasting an encoded ET data signal to a collection of receiving and irrigation-controlling units. The receiving and irrigation-controlling units include microprocessor means and storage means for storing a preset ET zone reference and crop adjustment values. The method also includes receiving and decrypting an encrypted ET data signal into a broadcast ET zone identifier and a broadcast corresponding ET value. The method further compares the broadcast ET zone identifier with the preset ET zone reference. The method adjusts an irrigation flow quantity responsive to the broadcast ET value, scaled by the crop adjustment value, when the broadcast ET zone identifier matches the preset ET zone reference.

16 Claims, 2 Drawing Sheets

METHOD AND APPARATUS FOR IRRIGATION CONTROL USING EVAPOTRANSPIRATION

BACKGROUND OF THE INVENTION

The present invention relates to the use of irrigation sprinkler controllers. More particularly, the invention relates to the reception and use of Evapotranspiration data by irrigation sprinkler controllers.

Irrigation is the artificial application of water to soil to promote plant growth. The practice dates back at least to the canals and reservoirs of ancient Egypt. Today, farmers and others irrigate hundreds of millions of acres of farmland throughout the world, most notably in the U.S., India, Pakistan, China, Australia, Egypt, and the USSR.

In the past, irrigation sprinkler controllers were often unwieldy and expensive. As a result, many agriculturalists erred in the direction of overwatering their crops to provide a margin of safety. Although overwatering adequately protects the crop investment, increased public concern over water consumption requires that agriculturalists cease this wasteful practice.

Modern methods have brought an increasing measure of control over the rate and timing of irrigation. Recent advances allow agriculturalists to make cost-effective timing adjustments on many remote sprinkler controllers.

Marian (U.S. Pat. No. 4,962,522), issued to the present inventor, exemplifies modern designs for irrigation control systems. The present description incorporates Marian by reference. Marian provides an apparatus and method for remotely controlling irrigation at one or more sites. The user need only periodically calculate an adjustment value to change preset values and then inform a central system. The central system, in turn, delivers the adjustment information via transmissions at commercial paging frequencies to individual sprinkler controllers.

Modernly, an agriculturalist calculates the proper sprinkler adjustment value by referring to Evapotranspiration (ET) data. The ET value represents the total water loss from the soil and vegetation over a predefined period. This water loss includes water lost by direct evaporation and by transpiration from the plant surfaces.

Thus, the ET value provides an indication of an amount of water that an irrigation system must replenish to maintain the plants in an unstressed condition. The ET value, often expressed in inches of water, depends on local weather information. A large state, such as California, can have thousands of different ET zones, each having its own dynamic ET values.

Measurement of water loss for one particular plant species established a normalized ET value. Each plant material has a crop adjustment value used to scale the normalized ET value. The scaled normalized ET value customizes the ET value for each particular plant species. An example of a common crop adjustment value used with ET values is a crop coefficient ($K_c$). The crop coefficient ($K_c$), expressed as a percentage, scales a particular ET value to provide a water quantity for the particular crop. The crop coefficient (Kc) can vary over time, depending upon particular seasons and a plant's water requirement for flowering or bearing fruit, for example. A number of references: Blaney, H. F., et al., (Aug. 1950), "Determining Water Requirements in Irrigated Areas from Climatological and Irrigation Data," *U.S. Dept. of Agri. Soil Conserv. Service*, pp. 1–48; Penman, H. L., (1948), "Natural Evaporation from Open Water, Bare Soil and Grass," *Proceedings*, Royal Soc., Series A., Vol. 193, pp. 120–145; Jensen, M. E., (Dec., 1963), "Estimating Evapotranspiration from Solar Radiation," *J. Irrig. and Drainage Div.*, pp. 15–41; Jensen, M. E., (Sep., 1983), Design and Operation of Farm Irrigation Systems,"*Am. Soc. Agri. Eng.*, No. 3, pp. 1–232; and "How Much Water Does Your Lawn Really Need," *Sunset*, (Jun. 1987), pp. 213–219; hereby incorporated by reference for all purposes, are suitable as a background source on ET and calculation of ET values.

ET has rapidly become a water-use standard—regulatory bodies in some areas demand that agriculturalists conduct irrigation only through use of ET values. In such areas, harsh penalties attach to water use which exceeds ET values. Such penalties provide impetus for users to limit their water use.

Many local variables, including temperature, humidity, wind, net solar radiation, soil temperature, and precipitation can affect the calculation of the ET value for a particular zone. Accordingly, agriculturalists must get extremely detailed and accurate weather profiles at regular intervals. Fortunately, governmental agencies usually provide ready access to ET information to users in states which are heavily dependent on irrigation. The government provides for user access to the ET data in several ways.

One avenue of user access to local ET data involves use of a personal computer and a modem to connect to a central government database. This user-intensive procedure requires the user to gain access to ET information and then to calculate the sprinkler adjustment value for each controller. If users have extensive irrigation requirements that span several ET zones and employ many controllers, this method can be time-consuming and error-prone.

Another avenue for supplying ET information is for local water control agencies to provide such information via daily phone recordings. Still another method of distributing ET values is publication in local newspapers or other periodicals. Again, these methods require a user to gain access to information and to calculate the adjustment value. Any particular publication may not cover ET zones that are not in a local area. The user must still search out the information, perform necessary calculations, and manually enter necessary changes, for each zone and controller. As the number of zones and the concomitant number of irrigation controllers increases, these solutions become increasingly cumbersome and inefficient.

A modern design, such as offered by U.S. Pat. No. 4,962,522 (Marian), represents a significant improvement in the art of irrigation controller design. It is now possible to control remote irrigation controllers daily. Nevertheless, such a controller is still dependent on human interaction, particularly in accessing, extracting and using desired ET values, as modified by the crop coefficient (Kc). The U.S. Pat. No. 4,962,522 patent does not address the problem and does not solve the heavy user demands problem.

A human being must still (1) access current ET information for each controller under his dominion. The user must then (2) calculate (either by hand or processing means) a proper sprinkler adjustment value responsive to the accessed ET data. Finally, the user must (3) enter the latest sprinkler adjustment value to a system for broadcast delivery to a collection of sprinkler controllers.

Thus, modern controllers are still dependent on humans to gain access to ET data periodically, to calculate an adjustment value, and to deliver the adjustment value. In fact, when an agriculturalist must access, calculate, and deliver information to hundreds of sprinkler controllers, such human interaction remains a burdensome and formidable task.

Accordingly, there is a need for an ET-data-based method and apparatus for controlling irrigation through access, calculation, and delivery of ET information to multiple controllers.

SUMMARY OF TUE INVENTION

The present invention provides a method and apparatus for controlling irrigation to replace water lost by evaporation and by transpiration.

More particularly, an embodiment of the present invention broadcasts coded ET values and corresponding ET zones directly to a collection of intelligent, microprocessor-based irrigation sprinkler controllers located over a wide geographic area. These controllers then produce an adjustment value responsive to the broadcast ET data for a particular ET zone.

It is an object of the invention to broadcast ET information directly to sprinkler controller sites. Thus, the invention bypasses the need for a human to gain access to ET information.

It is another object of the invention to end the need for a human being to calculate adjustment values.

It is yet another object of the invention to remove the need for delivering adjustment values to a sprinkler system.

It is yet another object of the invention to provide a system for broadcasting ET data directly to remote sprinkler controllers.

Other advantages and features of the invention will become apparent after considering the following drawings and detailed description.

DETAILED DESCRIPTION OF A PREFERRED EMBODIMENT

Modern controllers, such as Marian (U.S. Pat. No. 4,962,522), allow agriculturalists to adjust irrigation sprinkler controllers from a remote location. A user merely accesses updated ET information, calculates an adjustment value, and sends the adjustment value information to a central system. The central system, in turn, sends the information to the sprinkler controllers.

The present invention removes the human link from the process of remotely controlling irrigation sprinklers. The method and apparatus provided allows for the updated ET information to be broadcast directly to receivers coupled to irrigation sprinkler controllers distributed over a wide geographic area that includes several ET zones. Several well-known broadcast systems are suitable for sending the encoded ET information periodically. In the preferred embodiment, the ET information is broadcast directly over an FM subcarrier to a microprocessor-based receiver equipped to receive and decode such signals. Other broadcast methods, such as direct satellite transmission or preexisting paging systems, for example, could be used.

A special receiver selectively receives the ET broadcast, meaning that the receiver only responds to ET information for a particular preset zone. In the preferred embodiment, the receiver is microprocessor-based.

The receiver extracts ET information associated with the particular zone and automatically adjusts the sprinkler intervals to deliver the proper amount of water. The sprinkler controller is responsive to the updated ET information and is also responsive to preset crop- and irrigation-specific information about the particular crop, that is, the crop coefficient (Kc). The system is fully automatic, requiring negligible intervention by the various users.

Figure 1:
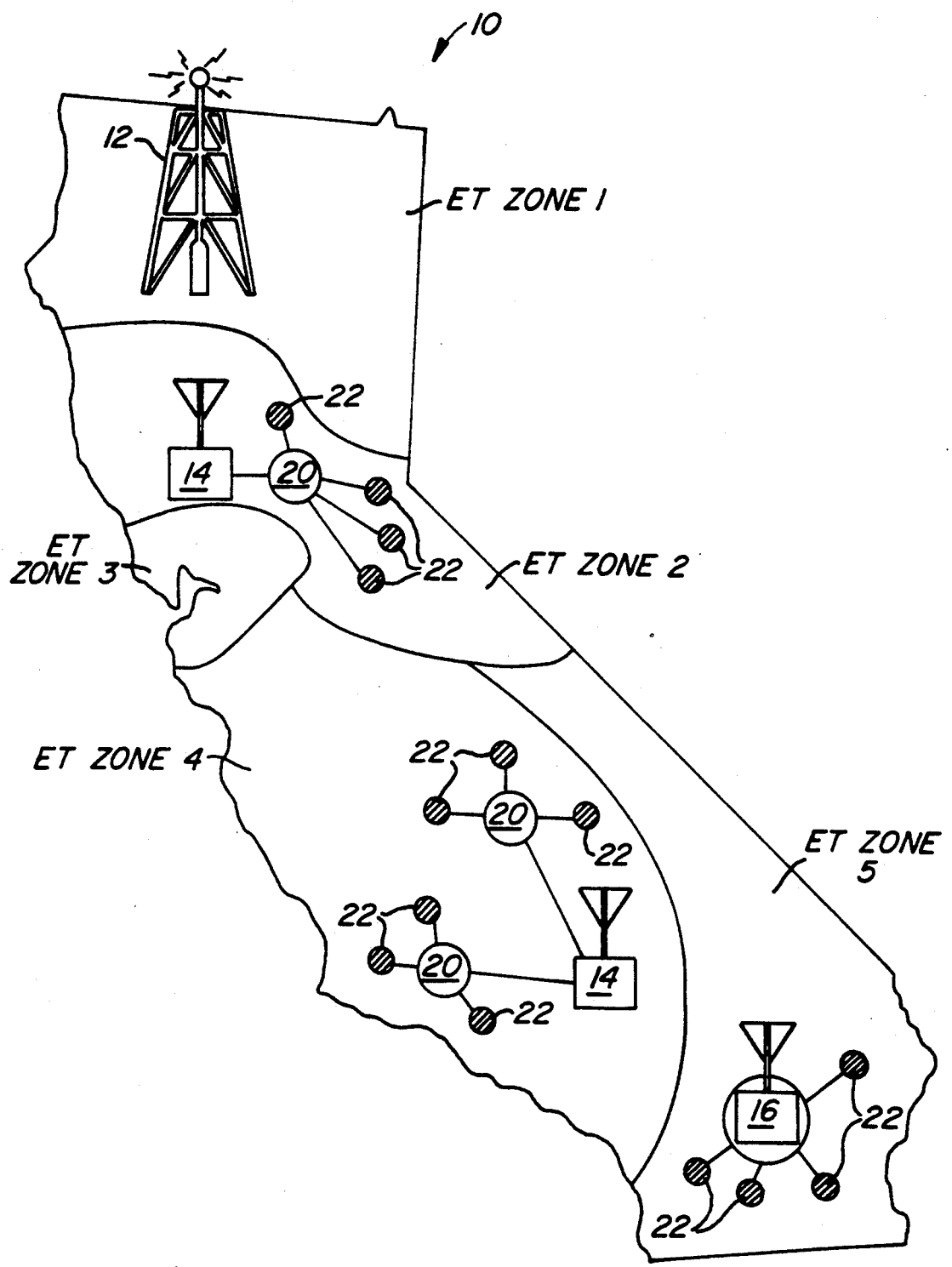
FIG. 1 is a graphical illustration of an irrigation control system 10 which shows a transmitter 12 in communication with a collection of receiver units 14 and receiver/controller units 16.

FIG. 1 illustrates a system 10 for directly broadcasting, by a transmitter 12, selected portions of an ET database to a collection of remotely-located receiving units 14 and sprinkler-controlling units 16. The receiving units 14 interface with a sprinkler controller 20 to control an irrigation flow, such as from a sprinkler 22, for example. The sprinkler-controller 16 integrally combines a receiving unit 14 and sprinkler controller 20.

The ET database contains ET values for various ET zones distributed over a wide geographic area. For purposes of illustration only, California is shown having five ET zones. Different ET values are generally applicable to each of the ET zones. The reader will understand that many thousands of zones exist, with many tens and hundreds of thousands individual receivers 14 and receivers-controllers 16 distributed in these zones. Each receiver 14 and receiver-controller 16 includes a prestored ET zone reference, as well as a crop coefficient ($K_c$). The receiver 14 and receiver-controller 16 control their respective irrigation flow controllers (e.g. sprinklers 22) responsive to a $K_c$ scaled ET value corresponding to an ET zone identifier in the broadcast matching the prestored ET zone reference.

In operation, the transmitter 12 periodically broadcasts a stream of coded ET zone identifiers, and corresponding coded ET values. Coding includes both a digitizing of the ET zone identifiers and corresponding ET values, as well as an encryption of the ET information broadcast to the various receivers 14 and to the receiver-controllers 16.

Each receiver 14 and receiver-controller 16 decodes the periodic broadcasts, waiting for an ET zone identifier matching the preset ET zone reference. When a match occurs, the receiver 14 (receiver-controller 16) uses the corresponding decoded ET value. The receiver 14 and receiver-controller 16 scale the ET value by the crop coefficient $K_c$ to produce a value corresponding to an amount of water (in inches) the sprinklers 22 are to apply to the crops.

Figure 2:
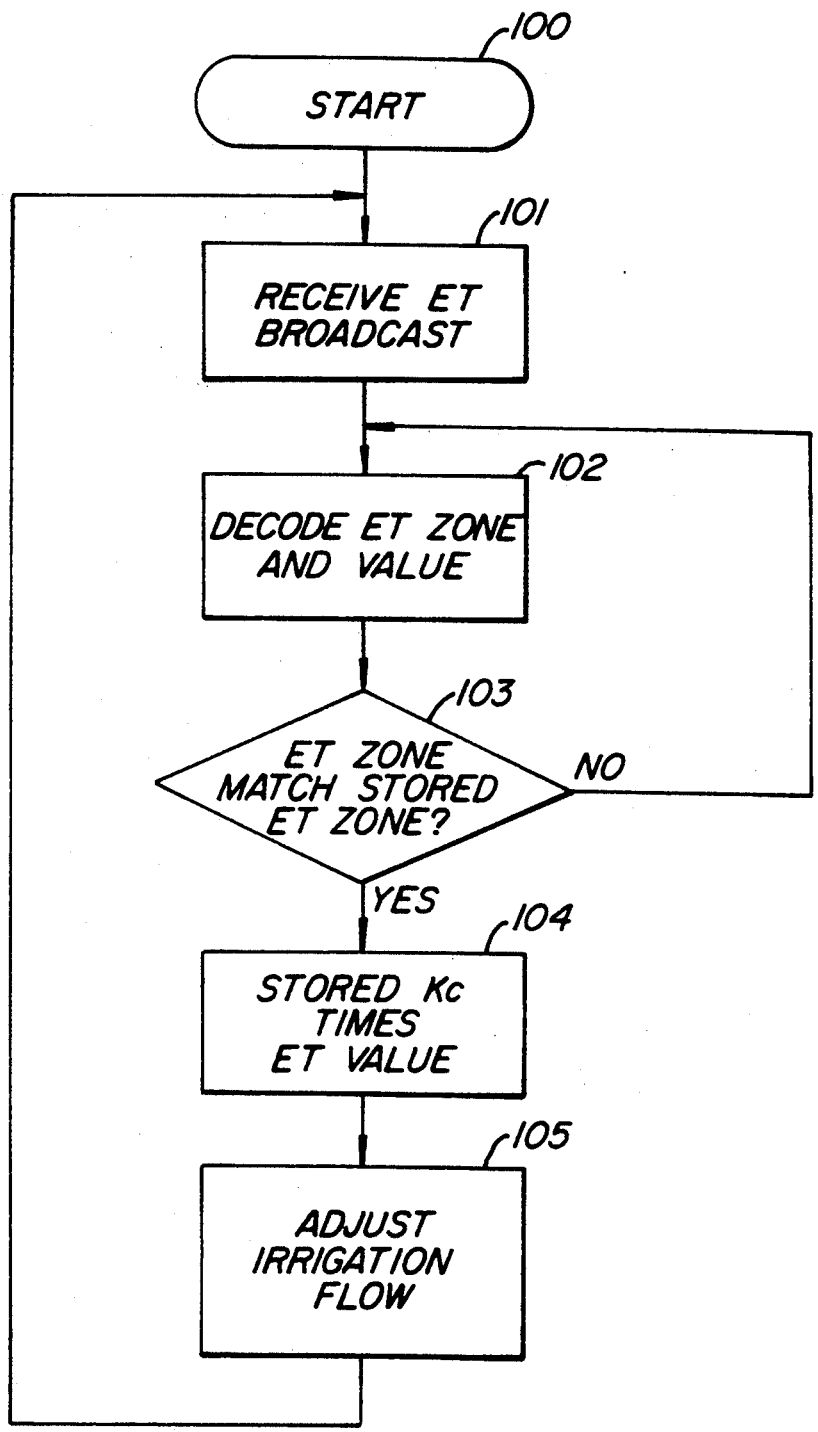
FIG. 2 is a flow diagram showing the various steps in the method according to the invention.

FIG. 2 is a flow diagram showing the various steps in operation of a receiver-controller 16 according to a preferred embodiment of the invention. Step 100 through step 105 identify a set of steps for automatically controlling an irrigation flow for a plurality of sprinklers distributed over a wide-geographic area including many ET zones.

Step 100 begins the process. The receiver-controller 16 receives an ET broadcast stream of coded ET information at step 101. At step 102, the receiver-controller 16 decodes each of the ET zone identifiers, and preferably the corresponding ET values, as they are received. For each decoded ET zone identifier, the receiver-controller 16 determines if any one particular decoded ET zone identifier matches with a stored preset ET zone reference. If the receiver-controller 16 determines that the ET zones do not match, the receiver-controller 16 returns to step 102 to decode the next ET zone identifier. This loop of steps 102 and 103 continues until an ET zone occurs. Matching advances the process to step 104 which scales the ET value corresponding to the matched ET zone identifier. Scaling in the preferred embodiment results from a product of the prestored crop coefficient ($K_c$) and the ET value. The resulting number, a quantity of water expressed in inches, is provided to a sprinkler controller portion of the receiver-controller 16. At step 105, the receiver-controller 16 adjusts irrigation flow to correspond to the scaled ET value. After adjusting the flow, the receiver-controller 16 returns to step 101, waiting for the next ET update. To promote reliability of the system 10, the transmitter 12 issues redundant broadcasts of ET data. Typically the ET values are updated every day, but less frequent updates are believed acceptable. Thus, the receiver-controller 16 must discriminate redundant broadcasts to provide the specified water amount.

The preferred embodiment discriminates the redundant transmissions by letting the scaled ET value update a watering interval to be used when the receiver-controller 16 normally would initiate irrigation flow. The broadcast does not initiate the irrigation in the preferred embodiment, but updates an interval used for the preset irrigation control timings.

The reader will understand that the preferred embodiment requires that the receiver-controller 16 be set to deliver a prespecified amount of water (inches) for a particular watering period. The receiver-controller 16 could then directly use the scaled ET value. For example, if the receiver-controller 16 operates the sprinklers for one-half hour for 1.00" of water, a scaled ET value of 0.50" would cause the sprinklers to operate for one-quarter hour. Other variations of timing are possible, depending upon the type of irrigation flow control.

Other refinements add to the range of use of the present invention. For example, the receiver may be part of a display unit which continuously displays one or more ET values associated with preselected ET zones. This display unit would continuously display the ET value for a present ET zone reference entered into the unit. An operator could make use of the ET value in many different ways.

While the above-described invention refers to a specific apparatus, skilled artisans will recognize that various other applications and alterations are obvious. The spirit and scope of the invention encompass such other applications and alterations. Only the appended claims limit the scope of the present invention.

What is claimed is:

1. A method of controlling irrigation, comprising the steps of:

locating a plurality of irrigation controllers, each for irrigation of a crop having an associated crop adjustment value, in a plurality of Evapotranspiration zones, each said irrigation controller including means for recording an Evapotranspiration zone reference and means for recording a crop adjustment value;

recording a particular one of said plurality of Evapotranspiration zones in said Evapotranspiration zone reference recording means of each irrigation controller within said particular Evapotranspiration zone;

recording said associated crop adjustment value in said crop adjustment recording means;

receiving a broadcast Evapotranspiration data signal at each of said plurality of irrigation controllers, said Evapotranspiration data signal including a plurality of Evapotranspiration zone identifiers and corresponding Evapotranspiration values;

comparing, at each irrigation controller, received Evapotranspiration zone identifiers with said Evapotranspiration zone reference stored in each particular controller until a particular one of said Evapotranspiration zone identifiers matches said Evapotranspiration zone reference to produce a match;

scaling, when a match is found, said Evapotranspiration value corresponding to said particular one Evapotranspiration zone identifier with said crop adjustment value recorded in said irrigation controller; and adjusting an irrigation flow quantity to about equal said scaled Evapotranspiration value.

2. A method of controlling irrigation sprinklers using broadcast Evapotranspiration data, comprising the steps of:

broadcasting an Evapotranspiration data signal to a collection of receivers coupled to a plurality of irrigation flow controllers, said Evapotranspiration data signal containing a plurality of coded Evapotranspiration zone identifiers and corresponding coded Evapotranspiration values, each of said collection of receivers including means for storing an Evapotranspiration zone reference and a crop adjustment value;

receiving said Evapotranspiration data signal;

decoding said Evapotranspiration data signal to produce a plurality of decoded Evapotranspiration zone identifiers and corresponding Evapotranspiration values;

comparing each of said decoded Evapotranspiration zone identifiers with said Evapotranspiration zone reference; and adjusting an irrigation flow quantity of particular ones of said plurality of flow controllers having said Evapotranspiration zone references matching a particular one of said decoded Evapotranspiration zone identifiers to about equal a product of a particular one of said Evapotranspiration values corresponding to said particular one decoded Evapotranspiration zone reference and said crop adjustment value.

3. The method of claim 2 wherein said broadcasting step comprises direct broadcasting from a geosynchronous communications satellite.

4. The method of claim 2 wherein said broadcasting step comprises direct broadcasting via FM subcarrier transmissions.

5. The method of claim 2 wherein said broadcasting step comprises direct broadcasting over a paging network.

6. The method of claim 2 wherein said broadcasting step includes encrypting Evapotranspiration broadcasts prior to broadcast and wherein said receiving step includes the step of decrypting said encoded information.

7. A system for controlling irrigation sprinklers using broadcast Evapotranspiration data, comprising:

means for broadcasting an Evapotranspiration data signal to a collection of receivers coupled to irrigation flow controllers, said Evapotranspiration data signal containing broadcast coded Evapotranspiration zone identifiers and broadcast coded corresponding Evapotranspiration value, each of said collection of receivers including means for storing a Evapotranspiration zone reference and a crop adjustment value;

means for receiving said Evapotranspiration data signal;

means, coupled to said receiving means, for decoding said Evapotranspiration data signal to produce a plurality of decoded Evapotranspiration zone identifiers and corresponding Evapotranspiration values;

means, coupled to said decoding means, for comparing each of said decoded Evapotranspiration zone identifiers with said Evapotranspiration zone reference; and means, coupled to said comparing means, for adjusting an irrigation flow quantity of said plurality of flow controllers having said Evapotranspiration zone references matching a particular one of said decoded Evapotranspiration zone identifiers to about equal a product of a particular one of said Evapotranspiration values corresponding to said particular one decoded Evapotranspiration zone reference and said crop adjustment value.

8. The system of claim 7 wherein said means for broadcasting comprises a geo-synchronous communications satellite capable of direct broadcast to earth-based receivers.

9. The system of claim 7 wherein said means for broadcasting comprises a means for broadcasting using FM subcarriers.

10. The system of claim 7 wherein said means for broadcasting comprises a means for broadcasting over a preexisting paging network.

11. The system of claim 6 wherein said means for receiving said Evapotranspiration data signal and said means for adjusting irrigation flow responsive to said crop control code comprise an integral receiving and controlling unit.

12. The system of claim 6 wherein said means for broadcasting includes means for encrypting said Evapotranspiration data signal and wherein said means for receiving includes means for decrypting said encoded Evapotranspiration data signal.

13. A method of controlling irrigation sprinklers by receiving and processing FM subcarrier broadcasts of Evapotranspiration data to control automatically a set of irrigation sprinklers, said method comprising the steps of:

directly broadcasting an Evapotranspiration data signal from a transmitter;

receiving said Evapotranspiration data signal at a receiver;

coupling said Evapotranspiration data signal from said receiver to an irrigation flow controller having a preset duty cycle for watering; and adjusting said preset duty cycle responsive to said Evapotranspiration data signal to provide an adjusted duty-cycle signal.

14. A system for regulating sprinkler controllers using direct broadcast of Evapotranspiration data, said system comprising:

means for directly broadcasting an Evapotranspiration data signal;

receiving means for receiving said Evapotranspiration data signal;

an irrigation sprinkler controller having a preset duty cycle for watering;

means for coupling said Evapotranspiration data signal from said receiving means to said irrigation sprinkler controller;

means for adjusting in said irrigation sprinkler controller said preset duty cycle for watering responsive to said Evapotranspiration data signal to provide an adjusted duty-cycle signal, whereby said irrigation sprinkler controls the amount of water sent to plants according to said adjusted duty-cycle signal.

15. A system for directly broadcasting selected portions of an Evapotranspiration database to a collection of receiving and sprinkler-controlling units distributed over a geographic area, each receiving and sprinkler-controlling unit being coupled to at least one irrigation sprinkler, said system comprising:

means for directly broadcasting a stream of encrypted Evapotranspiration data;

a plurality of irrigation sprinkler controllers, each of said controllers having a preset duty cycle for watering;

a plurality of receiving means for receiving said encoded Evapotranspiration data signal, each of said receiving means being coupled to at least one of said irrigation sprinkler controllers, and each receiving means including means for storing a preset Evapotranspiration zone reference and for storing a preset crop adjustment value;

each of said receiving means also including means for decrypting said encrypted irrigation control signal into a broadcast Evapotranspiration zone identifier and a broadcast corresponding Evapotranspiration value;

each of said receiving means coupled to irrigation sprinkler controller means including means of comparing said broadcast Evapotranspiration zone identifier with said preset Evapotranspiration zone reference such that each of said sprinkler controllers is selectively responsive to a corresponding one of said Evapotranspiration values of one of said zone identifiers;

means for coupling said Evapotranspiration data signal from each of said receiving means to said irrigation sprinkler controllers;

means for adjusting in said irrigation sprinkler controllers said preset duty cycles for watering responsive to said Evapotranspiration data signals and also responsive to said preset crop adjustment value to provide adjusted duty-cycle signals, whereby said each of said irrigation sprinkler controllers controls the amount of water sent to plants according to said adjusted duty-cycle signal.

16. A method of distributing Evapotranspiration information for a plurality of Evapotranspiration zones over a distributed geographic area for automatic adjustment of watering intervals for irrigation flow controllers, comprising the steps of:

compiling a database of a plurality of Evapotranspiration values for each of the plurality of Evapotranspiration zones;

matching each of said plurality of Evapotranspiration values with its corresponding Evapotranspiration zone to produce a set of Evapotranspiration zones having corresponding Evapotranspiration values; and broadcasting periodically said set of Evapotranspiration zones with corresponding Evapotranspiration values.

* * * * *